United States Patent

Tseng

[11] Patent Number: 5,785,841
[45] Date of Patent: Jul. 28, 1998

[54] METHOD OF REMOVING SULFUR DIOXIDE AND NITROGEN OXIDES FROM A GASEOUS STREAM

[75] Inventor: Shiaw C. Tseng, Pittsburgh, Pa.

[73] Assignee: Dravo Lime Company, Pittsburgh, Pa.

[21] Appl. No.: 635,330

[22] Filed: Apr. 19, 1996

Related U.S. Application Data

[63] Continuation-in-part of Ser. No. 434,871, May 4, 1995.
[51] Int. Cl.⁶ .......................... B01D 17/06; B01D 59/40; C01B 21/00; C01B 17/20
[52] U.S. Cl. .......................... 205/763; 205/770; 423/235; 423/242.3; 423/243.07; 423/244.07
[58] Field of Search .......................... 205/763, 770; 423/235, 242.3, 243.07, 244.07

[56] References Cited

U.S. PATENT DOCUMENTS

| | | | |
|---|---|---|---|
| 4,126,529 | 11/1978 | DeBerry | 204/180 |
| 4,612,175 | 9/1986 | Harkness et al. | 423/235 |
| 4,615,780 | 10/1986 | Walker | 204/182.4 |
| 4,670,234 | 6/1987 | Holter et al. | 423/235 |
| 4,820,391 | 4/1989 | Walker | 204/182.4 |
| 4,910,002 | 3/1990 | Grinstead | 423/235 |
| 4,957,716 | 9/1990 | Cichanowicz et al. | 423/235 |
| 5,200,160 | 4/1993 | Benson et al. | 423/235 |
| 5,320,816 | 6/1994 | Tsai et al. | 423/235 |

*Primary Examiner*—Kathryn L. Gorgos
*Assistant Examiner*—Edna Wong
*Attorney, Agent, or Firm*—Armstrong, Westerman, Hattori, McLeland & Naughton

[57] ABSTRACT

A method for removing sulfur dioxide and nitrogen oxides from a gaseous stream using a magnesium-enhanced lime scrubbing slurry containing a ferrous chelate where oxidized ferrous chelate is regenerated by electrochemical treatment. The spent scrubbing solution containing ferric chelates is passed as a catholyte, at an acidic pH of 4.0–6.5 through a cathode compartment while an anolyte solution containing magnesium sulfate, at a pH of 1.5 to 6.5 is passed through an anode compartment, the compartments separated by a microporous separator. An electrical current is passed from the cathode compartment to the anode compartment and ferric chelates are regenerated to ferrous chelates.

16 Claims, 2 Drawing Sheets

METHOD OF REMOVING SULFUR DIOXIDE AND NITROGEN OXIDES FROM A GASEOUS STREAM

CROSS-REFERENCE TO RELATED APPLICATION

This application is a continuation-in-part of U.S. application Ser. No. 08/434,871, filed May 4, 1995, and entitled "Electrode, Electrochemical Cell and Electrochemical Processes" now in the names of Richard J. Coin, Lynne M. Ernes, Andy W. Getsy, Edward M. Halko, Kenneth L. Hardee, Marylin J. Niksa and Shiaw C. Tseng, the inventor herein, said application assigned to ELTECH Systems Corporation and Dravo Corporation, the latter being the assignee of the present application.

BACKGROUND OF THE INVENTION

The removal of sulfur dioxide and nitrogen oxides from gaseous streams, such as coal combustion gas streams, has become necessary to protect the environment. Various such processes have been developed which include the use of slurries of calcium hydroxide or magnesium hydroxide to remove sulfur dioxide, with the addition of a metal chelate, such as ferrous ethylenediaminetetraacetic acid (ferrous-EDTA), to remove nitrogen oxides in a wet scrubbing system. As examples of processes where sulfur dioxide and nitrogen oxides are both removed from a gaseous stream, reference is made to U.S. Pat. Nos. 4,612,175, 4,670,234 and 5,200,160, the contents of these three patents being incorporated by reference herein.

A problem which has existed where a metal chelate, such as ferrous-EDTA, is used in combined sulfur dioxide and nitrogen oxide wet scrubbing systems is the tendency of ferrous-EDTA to combine with oxygen in the system which oxidizes the ferrous-EDTA to ferric-EDTA, the latter being ineffective for nitrogen oxide removal. Various systems have thus been proposed to either reduce the degree of oxidation of the ferrous-EDTA or regenerate ferric-EDTA back to ferrous-EDTA, or both. The reduction of ferric-EDTA to ferrous-EDTA can be effected by the use of reducing chemicals. However, such usage of reducing chemicals can lead to the formation of additional compounds in the system aqueous media that have to be disposed of along with solid calcium sulfite sludges from such systems. Another means of reducing ferrous-EDTA to ferric-EDTA makes use of electrochemical cells, as described for example in U.S. Pat. Nos. 4,126,529, 4,615,780, 4,910,002 and 5,320,816.

It is an object of the present invention to provide a method of removing sulfur dioxide and nitrogen oxide from a gaseous stream using an aqueous scrubbing medium containing sulfites and ferrous chelates where ferric chelates produced are regenerated to ferrous chelates using an electrochemical cell in an efficient manner.

SUMMARY OF THE INVENTION

A method is provided where a magnesium-enhanced lime scrubbing slurry containing a ferrous chelate is used to remove both sulfur dioxide and nitrogen oxides from a gaseous stream.

Ferrous chelates that are oxidized to ferric chelates during the contact of the scrubbing slurry in a wet scrubbing unit with the gases are regenerated by electrochemical treatment of spent aqueous medium from the wet scrubbing unit. In the wet scrubbing unit, sulfites and bisulfites react to remove sulfur dioxide from the gas while ferrous chelates aid in the removal of nitrogen oxides. A spent aqueous scrubbing medium is formed which contains solids, such as solid sulfites, and dissolved ferric chelates. The spent aqueous medium is discharged from the wet scrubbing unit and the solid sulfites separated from the aqueous scrubbing medium to provide an aqueous solution of ferric chelates, which aqueous solution is treated to regenerate ferrous chelates.

Treatment of the aqueous solution of ferric chelates is effected in an electrochemical cell which contains a cathode compartment and an anode compartment, the compartments separated by a separator, such as a microporous separator. The aqueous solution of ferric chelates is passed, as a catholyte, at an acidic pH of between about 4.0–6.5, to the cathode compartment and passed therethrough. The anode compartment of the electrochemical cell contains a corrosion resistant anode and an anolyte feed solution is charged thereto, at an acidic pH of between about 1.5 to 6.5, which anolyte feed solution contains magnesium sulfate, with the anolyte feed solution passed through the anode compartment. An electrical current is passed from the cathode compartment to the anode compartment which effects reduction of the ferric chelates to form a regenerated ferrous chelate solution. The regenerated ferrous chelate solution is then recycled to the wet scrubbing unit for use as ferrous chelate to remove nitrogen oxides from the gases passing through the wet scrubbing unit.

DETAILED DESCRIPTION

Figure 1:
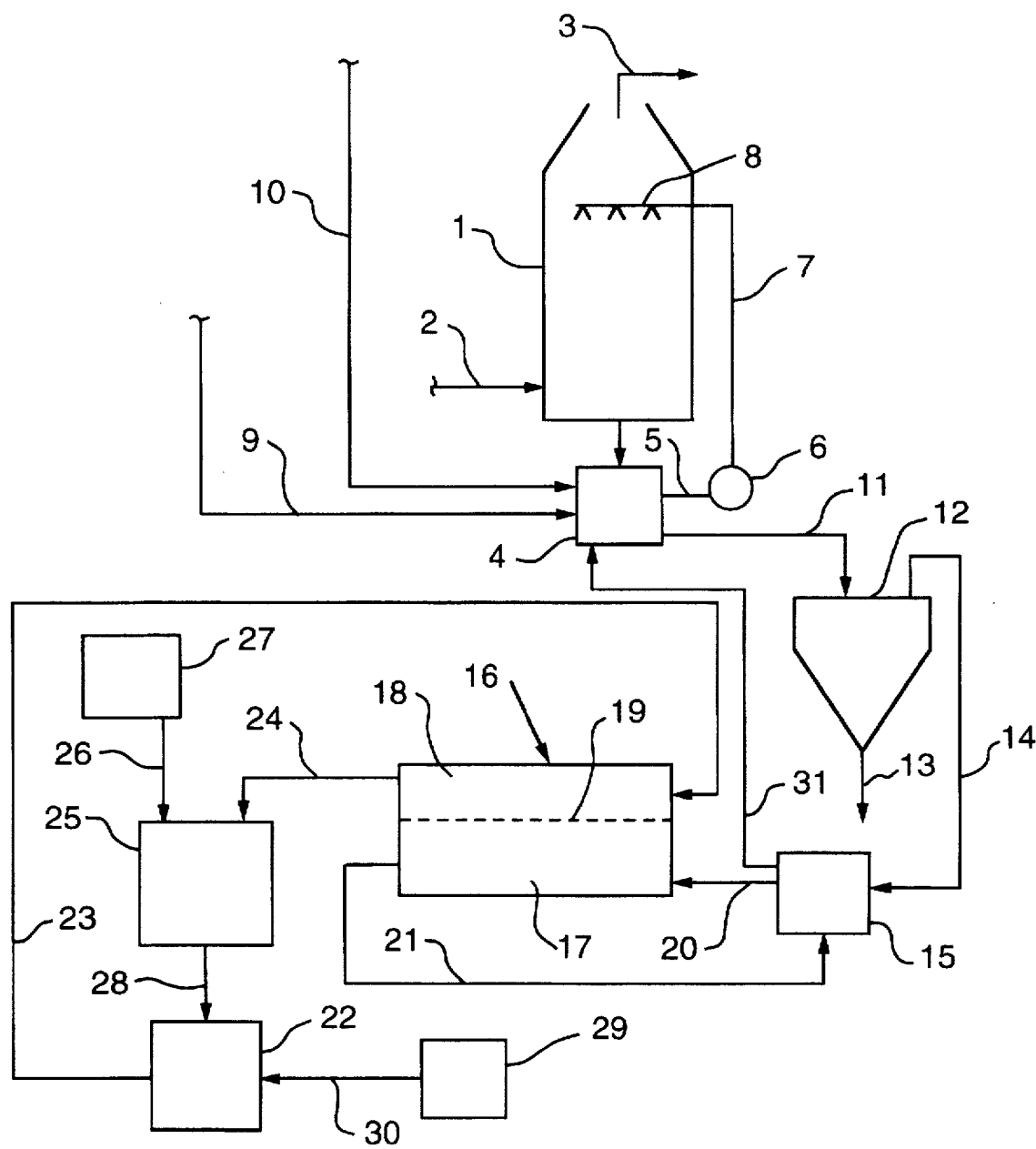
FIG. 1 is a schematic illustration of an embodiment of the method of the present invention.

The present method achieves the removal of sulfur dioxide and nitrogen oxides from a gaseous stream using an aqueous scrubbing medium with regeneration of ferric chelates produced to ferrous chelates using an electrochemical cell.

A gaseous stream containing sulfur dioxide and nitrogen oxides is contacted in a wet scrubbing unit with an aqueous scrubbing medium containing sulfites, such as calcium sulfate, calcium bisulfite, magnesium sulfite and magnesium bisulfite or mixtures thereof, to react with and remove sulfur dioxide, and ferrous chelates, such as ferrous EDTA, to react with and remove nitrogen oxides. The aqueous scrubbing medium is preferably an aqueous slurry containing lime or limestone that contains a minor amount, based on lime or limestone, of magnesium ions, such as provided in U.S. Pat. No. 5,200,160. The process of removing sulfur dioxides and nitrogen oxides using such an aqueous scrubbing medium is known, and the present process is directed to the regeneration of ferric chelates in solution in the spent aqueous scrubbing to ferrous chelates such that the same may return to the scrubbing system for re-use.

In accordance with the present method, spent aqueous scrubbing medium, as a bleed stream, is discharged, such as from a hold tank associated with a wet scrubbing unit, and solids removed therefrom to provide an aqueous solution containing residual ferrous chelates and ferric chelates that result from oxidation of ferrous chelates in the wet scrubbing unit with oxygen present therein. The solids, where a magnesium-enhanced lime slurry is used in the wet scrubbing unit to remove sulfur dioxide, will primarily comprise calcium sulfites, and some calcium sulfate, while magnesium sulfites and sulfates present in the spent aqueous medium will be in solution along with the ferric chelate.

The aqueous solution containing ferric chelates, after separation of solids, is passed, as a catholyte and at an acidic pH of between about 4.0–6.5, most preferably a pH of between 5.0–6.0, to a cathode compartment of an electrochemical cell. The electrochemical cell comprises a cathode compartment and anode compartment separated by separator. A cathode provided in the cathode compartment should be a corrosion resistant cathode, such as a DSA® coated titanium metal cathode of titanium metal plates or wire mesh, while an anode provided in the anode chamber may be made of precious metal oxide coated titanium. The separator would comprise membranes and diaphragms, such as electrolyte permeable diaphragms, as are known in the art for electrochemical cell construction. As described in co-pending parent application Ser. No. 08/434,871, a synthetic, electrolyte permeable diaphragm can be utilized. The synthetic diaphragms generally rely on a synthetic polymeric material, such as polyfluoroethylene fiber as disclosed un U.S. Pat. No. 4,606,805 or expanded polytetrafluoroethylene as disclosed in U.S. Pat. No. 5,183,545. Such synthetic diaphragms can contain a water insoluble inorganic particulate, e.g., silicon carbide, or zirconia, as disclosed in U.S. Pat. No. 5,188,712, or talc as taught in U.S. Pat. No. 4,606,805. Of particular interest for the diaphragm is the generally non-asbestos, synthetic fiber diaphragm containing inorganic particulates as disclosed in U.S. Pat. No. 4,853,101. The teachings of this patent are incorporated herein by reference.

Broadly, this diaphragm of particular interest comprises a non-isotropic fibrous mat wherein the fibers of the mat comprise 5–70 weight percent organic halocarbon polymer fiber in adherent combination with about 30–95 weight percent of finely divided inorganic particulates impacted into the fiber during fiber formation. The diaphragm has a weight per unit of surface area of between about 3 to about 12 kilograms per square meter. Preferably, the diaphragm has a weight in the range of about 3–7 kilograms per square meter. A particularly preferred particulate is zirconia. Other metal oxides, i.e., titania, can be used, as well as silicates, such as magnesium silicate and alumino-silicate, aluminates, ceramics, cermets, carbon, and mixtures thereof.

A preferred diaphragm for the electrochemical cell is a compressed, non-isotropic fibrous diaphragm marketed under the trademark "ELRAMIX".

In general, the diaphragm compression may be within the range of from about one ton per square inch up to about six tons per square inch, or more, e.g., seven tons per square inch. However, such is more typically from about one to less than five tons per square inch. The diaphragms can be heated during compression for fusing and compressing the diaphragms. Further details concerning these diaphragms are disclosed in U.S. Pat. No. 5,246,559. The diaphragms can be treated with a surfactant prior to use. The treatment can be carried out in accordance with the procedure set forth in the Bon U.S. Pat. No. 4,606,805, or in accordance with the procedure set forth in the Lazarz et al. U.S. Pat. No. 4,252,878.

The anode compartment contains a corrosion resistant anode and an anolyte feed source is provided to pass an anolyte feed solution to and through the anode compartment, the anolyte feed solution having an acidic pH of between about 1.5 to 6.5, preferably between 2.0–4.0, and contains magnesium sulfate. The amount of magnesium sulfate in the aqueous anolyte solution should be between about 1–20 percent by weight as $MgSO_4.7H_2O$. The magnesium sulfate may be formed by reaction of magnesium hydroxide and sulfuric acid and additional sulfuric acid used to provide the acid pH of about 1.5 to 6.5.

As the catholyte and anolyte are passed through the electrochemical cell on opposite sides of the microporous separator, an electrical current is passed from the cathode compartment to the anode compartment so as to reduce ferric chelates in the catholyte solution to ferrous chelate and thus form a regenerated ferrous chelate solution. The regenerated ferrous chelate solution may then be returned to the scrubbing system, such as by addition to a hold tank of a wet scrubbing unit and used to remove further nitrogen oxides from a gaseous stream.

Referring now to the drawing which is a schematic illustration of the present method, a wet scrubbing unit 1 is provided to which a gaseous stream containing sulfur dioxide and nitrogen oxides is fed through line 2 with the gases flowing through the scrubbing unit 1 and clean gases discharged through line 3. An aqueous scrubbing medium containing sulfites, such as calcium sulfite and calcium bisulfite and magnesium sulfite and magnesium bisulfite, and a ferrous chelate, is provided in recycle tank 4 and passed through line 5 to a pump 6 and then through recycle line 7 through sprayers 8 in the wet scrubbing unit 1, which aqueous scrubbing medium contacts the gaseous stream, preferably by countercurrent flow, such that the sulfites and bisulfites react with and remove sulfur dioxide from the gaseous stream and the ferrous chelate reacts with and removes nitrogen oxides therefrom. Some ferrous chelate, due to oxygen present in the system, will be oxidized to ferric chelate. After contact, the aqueous scrubbing medium will thus contain solids, such as calcium sulfites and a solution of ferric chelates. Replenishment of the aqueous scrubbing solution is effected by addition of lime and/or magnesium hydroxide through line 9 to the recycle tank 4, while make-up ferrous chelate is added to the recycle tank 4 through line 10.

Spent aqueous scrubbing medium containing solids, such as calcium sulfites, and ferric chelates in solution are removed from the scrubbing system, such as through line 11 to a solids separator 12. In the solids separator 12, the solids are separated from the spent aqueous scrubbing medium and discharged through line 13 for disposal. The clarified liquor or spent aqueous medium containing ferric chelates in solution, after separation of the solids, is passed through line 14 to a catholyte feed tank 15.

An electrochemical cell (E-cell) 16 is provided which contains a cathode compartment 17 and an anode compartment 18, the two compartments separated by a separator 19, such as a diaphragm microporous separator. The catholyte solution, at a pH of between 4.0–6.5 is fed from catholyte feed tank 15, by means of line 20 to the cathode compartment 17 of the electrochemical cell 16 and then from the cathode compartment 17 back to the catholyte feed tank 15 through line 21. An anolyte feed tank 22 feeds an anolyte feed solution, at a pH of between 1.5 to 6.5 and containing magnesium sulfate, through line 23 to the anode compartment 18 of the electrochemical cell 16. After passage through the anode compartment 18, the anolyte is fed through line 24 to a neutralization tank 25. Lime or magnesium hydroxide are fed to the neutralization tank through line 26, from a source 27 and adjusts the pH of the anolyte which is thus returned to the anolyte feed tank 22 through line 28. Make-up magnesium sulfate is charged to the anolyte feed tank 22, from a source 29, through line 30.

Passage of an electrical current from the cathode compartment 17 to the anode compartment 18 of the electrochemical cell 16 reduces ferric chelates present in the catholyte to ferrous chelates so as to form a regenerated ferrous chelate solution that is returned through line 21 to the catholyte feed tank 15, and a portion thereof is returned to the recycle tank 4 of the scrubbing unit 1 through line 31.

EXAMPLE I

An electrochemical cell was provided that comprised an anode compartment containing a dimensionally stable anode (DSA®) of precious metal oxide coated titanium, a cathode compartment containing a high surface area multi-layer DSA® coated titanium, and a porous separator. The separator was a piece of ELRAMIX® diaphragm, a porous composite of PTFE and zirconia. The diaphragm keeps $Fe^{+2}$-EDTA away from the anode where it would be re-oxidized to $Fe^{+3}$-EDTA. The geometric area of the cathode was 1.39 $Ft^2$.

The electrochemical cell was run with the concentration of the total iron in the catholyte being 105.7 mM while the anolyte was a 10 weight percent aqueous solution of magnesium sulfate (as $MgSO_4.7H_2O$). The volume of the catholyte was 15 liters and the flowrate of catholyte through the cathode chamber of the electrochemical cell was 4 liters/min. The temperature of the catholyte in the catholyte tank was controlled at ~130° F. The pH of the catholyte remained constant at about 6 throughout the test. The pH of the anolyte feed tank was controlled at 2.5 using 10 weight percent aqueous magnesium hydroxide slurry. The current applied to the cell was 25 Amps. Results are listed in Table I:

catholyte chamber. This bucket also served a surge tank for the cell. A stream of the liquor from this bucket was pumped into a recycle tank to maintain the concentration of the ferrous ions in the recycle tank to continuously scrub NO.

The operating conditions for the electrochemical cell were the same as described in Example I. Fresh synthetic liquor containing about 100 mM of total dissolved iron was used in the 5 kW scrubbing circuit. The liquor was prepared as follows (per 10 liter solution): $Mg(OH)_2$=180 grams, $MgCl_2.6H_2O$=120 grams, $H_2SO_3$ (6%)=1,000 cc, HCl (33%)=20 cc, $Fe_2SO_4.7H_2O$=280 grams, and EDTA acid= 365 grams. The pH of the liquor in the recycle (or reaction) tank was controlled at 5.5. The synthetic gas was prepared by blending compressed air with nitrogen from bottles. The mixed gas was then doped with $SO_2$ and NO. The total flowrate of the synthetic flue gas was at about 226 liters/min (or 8 $ft^3$/min). The inlet $SO_2$, NO, and $O_2$ concentrations were set at about 2,500 ppmv, 600 ppmv, and 10 vol %, respectively. The scrubber was equipped with 5 trays. About 80% of the space above the middle three trays was filled with ½" ceramic Berl saddle packings. About 50% of the space above the bottom tray was filled with ⅜" Berl saddle packing.

The test started at 9:40 A.M. and ended at about 4 P.M. Throughout the test the inlet and outlet concentrations of $SO_2$ were monitored on-line by an $SO_2$ analyzer (Model 721-AT made by Western Research). The inlet and outlet concentrations of NO were monitored by a Model 10 $NO_x$ analyzer (by Thermal Environmental industrial, Inc.). The inlet and outlet concentrations of $O_2$ were monitored by an

TABLE I

| Elapsed Time (min) | $[Fe^{+2}]$ at cell inlet (mM) | $[Fe^{+2}]$ at cell outlet (mM) | Voltage Across Cell (V) | Total Current (Amp) | Catholyte Temp in bucket (°F.) | Liquor pH in bucket | Total Electricity (Coulomb) |
|---|---|---|---|---|---|---|---|
| 0 | 6.8 |  | 4.8 | 25 | 130.2 | 6.0 | 0 |
| 10 | 16.2 | 19.8 | 4.8 | 25 | 129 | 6.0 | 13,600 |
| 20 | 25.9 |  | 4.8 | 25 | 130.5 | 5.9 | 27,200 |
| 30 | 31.6 | 39.9 | 4.7 | 25 | 132 | 6.0 | 40,700 |
| 40 | 46.6 |  | 4.8 | 25 | 131 | 6.0 | 54,300 |
| 50 | 52.6 | 55.4 | 4.9 | 25 | 130.2 | 5.9 | 67,900 |
| 60 | 60.8 |  | 5 | 25 | 130 | 6.0 | 81,500 |
| 70 | 66.1 | 67.8 | 5.2 | 25 | 129.8 | 5.9 | 95,000 |

The ferrous ion concentration at the cell inlet increased as the test progressed. By using linear regressional analysis, the concentration of the ferrous ions in the catholyte feed bucket and the amount of electricity fell on straight lines. The current efficiency was calculated to be 93.08%. The current efficiency was defined as ratio of the amount of electricity utilized in reducing ferric ions into ferrous ions by the amount of electricity consumed.

DSA® and ELRAMIX® are registered trademarks of Electrode Corporation.

EXAMPLE II

The electrochemical cell described in Example I was integrated into a scrubber circuit of a 5 kW scrubbing unit.

To integrate the electrochemical cell into the 5 kW unit, the overflow liquor from the thickener flew by gravity through an in-line filter and entered a bucket feeding the Series #1400 $O_2$ analyzer (by Servomex). The concentration of the ferrous ions in the recycle tank was measured by an Spectronic 601 UV-VIS spectrometer (Spec-601: by Milton Roy Company). The concentrations of dissolved magnesium, $[Mg^{+2}]$; calcium, $[Ca^{+2}]$; total iron, [total Fe]; and sodium $[Na^{+1}]$ ions were measured by a Model PS 1000 inductively coupled plasma spectrometer (ICP: by Lesman Labs, Inc.). The concentrations of the dissolved sulfite $[SO_3^{-2}]$, sulfate $[SO_4^{-2}]$, nitrate $(NO_3^{-1})$, and chloride $(Cl^{-1})$ were measured by a Model 4500i ion chromatography (IC: by Dionex). The solids content in the filter cakes was measured by using an infrared lamp heater (P/N 900207.1 by Denver Instrument Co.).

The results of the 5 kW unit test are listed in Table II.

TABLE II

| Clock Time (Hr:Min) | Recycle Tank Liquor pH | Alkalinity (ppm) | [Fe$^{+2}$]RT by Spec-610 (mM) | [Mg$^{+2}$] by ICP (ppm) | [Ca$^{+2}$] by ICP (ppm) | [Total Fe] by ICP (ppm) | [Na$^{+2}$] by ICP (ppm) | [SO$_3^{-2}$] by IC (ppm) | [SO$_4^{-2}$] by IC (ppm) | [Cl$^{-1}$] by IC (ppm) | Filter-cake Solids (wt %) | SO$_2$ Removal (%) | NO Removal (%) |
|---|---|---|---|---|---|---|---|---|---|---|---|---|---|
| 9:40  | 5.5  | 2,168 | 56.7 | 8,035  | 951 | 5,493 | 48 | 9,463  | 9,037  | 3,906 |      | 96.17 | 58.54 |
| 11:00 | 5.55 | 2,535 | 59.4 | 8,729  | 875 | 5,703 | 31 | 10,961 | 10,460 | 4,517 | 64.1 | 94.41 | 54.48 |
| 12:00 | 5.6  | 2,702 | 57.1 | 8,740  | 780 | 5,520 | 33 | 11,173 | 10,976 | 4,447 | 71.2 | 94.58 | 52.09 |
| 13:00 | 5.45 | 2,952 | 55.2 | 9,241  | 709 | 5,581 | 37 | 11,124 | 11,823 | 4,339 | 76.6 | 94.37 | 53.04 |
| 14:00 | 5.4  | 2,802 | 55.7 | 9,533  | 659 | 5,591 | 34 | 12,013 | 12,610 | 4,136 | 78.2 | 94.74 | 52.67 |
| 15:00 | 5.35 | 2,502 | 55.7 | 9,836  | 762 | 5,572 | 32 | 11,857 | 13,776 | 4,100 | 61.9 | 95.29 | 53.89 |
| 16:00 | 5.4  | 3,052 | 55.6 | 10,120 | 720 | 5,552 | 33 | 12,131 | 14,487 | 3,975 | 71.1 | 96.32 | 53.51 |

Figure 2:
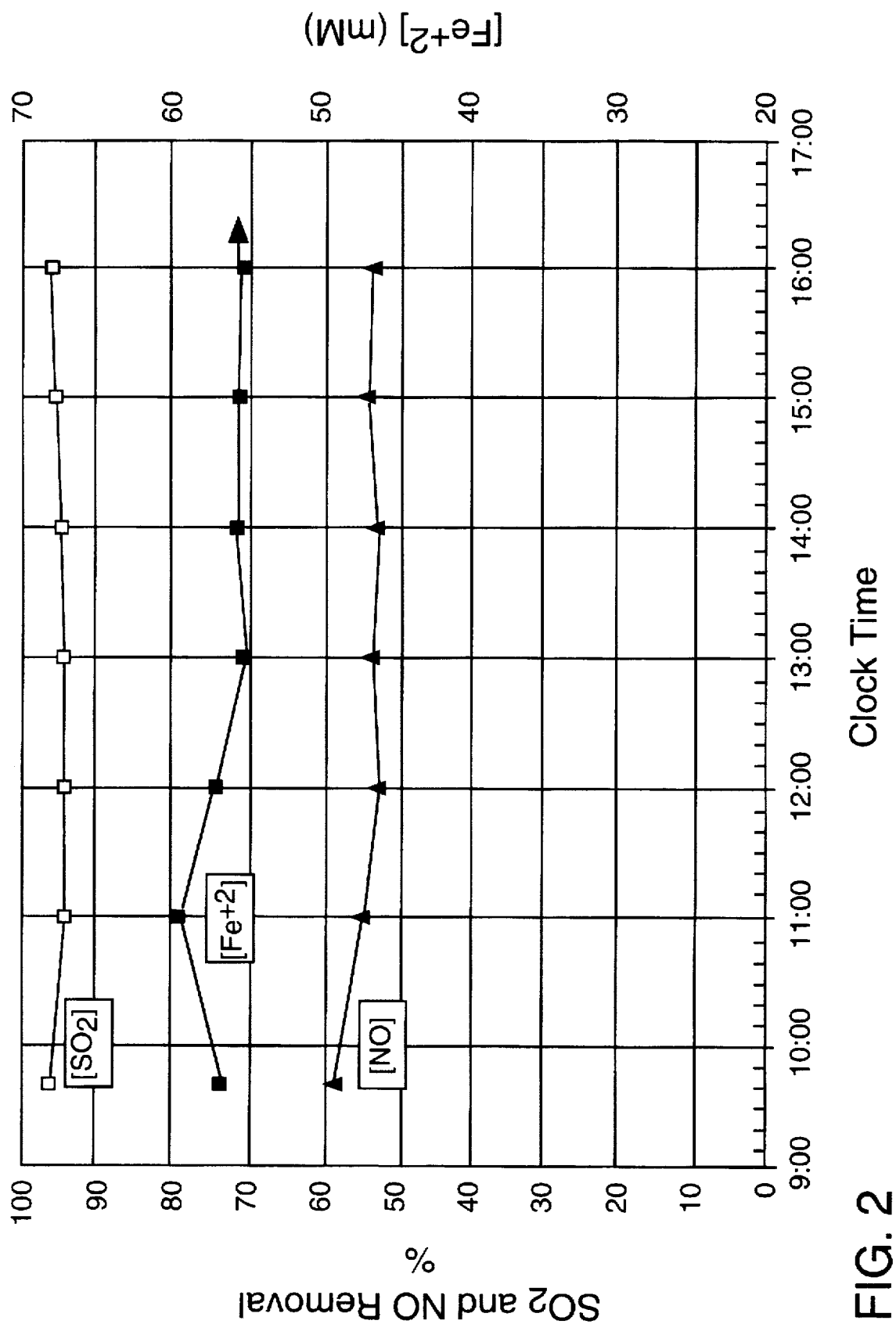
FIG. 2 illustrates the $SO_2$ and NO removals and $[Fe^{+2}]$ in the recycle tank as results of Example II of the present specification.

Shown in FIG. 2 is a plot of SO$_2$ and NO removals and the concentration of the ferrous ions in the recycle tank. The SO$_2$ and NO removals stabilized at 95% and 53%, respectively. The recycle tank ferrous ions concentrations stabilized at about 55 mM.

What is claimed is:

1. In a method of removing sulfur dioxide and nitrogen oxides from a gaseous stream wherein said gaseous stream is contacted with an aqueous scrubbing medium containing sulfites which react with and remove sulfur dioxide therefrom and ferrous chelates which react with and remove nitrogen oxides therefrom to form a spent aqueous scrubbing medium containing solids and a solution of ferric chelates, the improvement comprising:

separating the solids from said spent aqueous scrubbing medium to provide the aqueous solution of ferric chelates;

passing said aqueous solution of ferric chelates as a catholyte, at an acidic pH of 4.0–6.5, to a cathode compartment of an electrochemical cell containing said cathode compartment and an anode compartment separated from said cathode compartment by a separator, said electrochemical cell having a corrosion resistant anode, and an anolyte feed solution in said anode compartment having an acidic pH of 1.5 to 6.5 and containing magnesium sulfate;

passing an electrical current from said cathode compartment to said anode compartment to reduce ferric chelates in said catholyte to ferrous chelates and form a regenerated ferrous chelate solution; and recycling said regenerated ferrous chelate solution to said contacting step for use as said ferrous chelates.

2. The method of removing sulfur dioxide and nitrogen oxides from a gaseous stream as defined in claim 1 wherein said sulfites which react with and remove sulfur dioxide are selected from the group comprising calcium sulfite, calcium bisulfite, magnesium sulfite, magnesium bisulfite and mixtures thereof.

3. The method of removing sulfur dioxide and nitrogen oxides from a gaseous stream as defined in claim 1 wherein said ferrous chelates are ferrous ethylenediaminetetraacetic acid (ferrous-EDTA).

4. The method of removing sulfur dioxide and nitrogen oxides from a gaseous stream as defined in claim 1 wherein the acidic pH of said catholyte is between 5.0 and 6.0.

5. The method of removing sulfur dioxide and nitrogen oxides from a gaseous stream as defined in claim 1 where the acidic pH of said anolyte feed solution is between 2.0 and 4.0.

6. The method of removing sulfur dioxide and nitrogen oxides from a gaseous stream as defined in claim 1 wherein effluent from said anode compartment is at a pH of greater than 1.5.

7. The method of removing sulfur dioxide and nitrogen oxides from a gaseous stream as defined in claim 1 wherein said cathode compartment contains titanium metal cathodes.

8. The method of removing sulfur dioxide and nitrogen oxides from a gaseous stream as defined in claim 1 wherein said anode compartment contains a corrosion resistant anode comprising a precious metal oxide coated titanium.

9. The method of removing sulfur dioxide and nitrogen oxides from a gaseous stream as defined in claim 1 wherein said separator comprises a synthetic, electrolyte permeable diaphragm.

10. The method of removing sulfur dioxide and nitrogen oxides from a gaseous stream as defined in claim 1 wherein said anolyte feed solution contains between about 1–20 percent magnesium sulfate as MgSO$_4$.7H$_2$O.

11. In a method of removing sulfur dioxide and nitrogen oxides from a gaseous stream wherein said gaseous stream is contacted with an aqueous magnesium-enhanced lime scrubbing medium containing sulfites which react with and remove sulfur dioxide therefrom and ferrous ethylenediaminetetraacetic acid (ferrous EDTA) which react with and remove nitrogen oxides therefrom to form a spent aqueous scrubbing medium containing solids and a solution of ferric ethylenediaminetetraacetic acid (ferric EDTA), the improvement comprising:

separating the solids from said spent aqueous scrubbing medium to provide the aqueous solution of ferric EDTA;

passing said aqueous solution of ferric EDTA as a catholyte, at an acidic pH of 4.0–6.5, to a cathode compartment of an electrochemical cell containing said cathode compartment and an anode compartment separated from said cathode compartment by a microporous separator, said electrochemical cell having a corrosion resistant anode, and an anolyte feed solution in said anode compartment having an acidic pH of 1.5 to 6.5 and containing magnesium sulfate;

passing an electrical current from said cathode compartment to said anode compartment to reduce ferric EDTA in said catholyte to ferrous EDTA and form a regenerated ferrous EDTA solution; and recycling said regenerated ferrous EDTA solution to said contacting step for use as said ferrous EDTA.

12. The method of removing sulfur dioxide and nitrogen oxides from a gaseous stream as defined in claim 11 wherein the acidic pH of the catholyte is between 5.0 and 6.0 and the acidic pH of the anolyte feed solution is between 2.0 and 4.0.

13. The method of removing sulfur dioxide and nitrogen oxides from a gaseous stream as defined in claim 11 wherein said anode compartment contains a corrosion resistant anode comprising a precious metal oxide coated titanium.

14. The method of removing sulfur dioxide and nitrogen oxides from a gaseous stream as defined in claim 11 wherein said separator comprises a synthetic, electrolyte permeable diaphragm.

15. The method of removing sulfur dioxide and nitrogen oxides from a gaseous stream as defined in claim 11 wherein effluent from said anode compartment is at a pH of greater than 1.5.

16. The method of removing sulfur dioxide and nitrogen oxides from a gaseous stream as defined in claim 11 wherein said anolyte feed solution contains between about 1–20 percent magnesium sulfate as $MgSO_4.7H_2O$.

* * * * *